(12) United States Patent
Schwerzig et al.

(10) Patent No.: US 10,852,496 B2
(45) Date of Patent: Dec. 1, 2020

(54) OPTOELECTRONIC MODULE, AND DEVICE FOR TOOLESSLY MOUNTING/DEMOUNTING AN OPTICAL CONTACT ELEMENT

(71) Applicant: RADIALL SA, Aubervilliers (FR)

(72) Inventors: Rémy Schwerzig, Rochefort (FR); François Quentel, Ville sous Anjou (FR); Laurent Valencia, St Genix les Villages (FR); Daniel Mousseaux, Cessieu (FR)

(73) Assignee: RADIALL, Aubervilliers (FR)

( * ) Notice: Subject to any disclaimer, the term of this patent is extended or adjusted under 35 U.S.C. 154(b) by 0 days.

(21) Appl. No.: 16/406,704

(22) Filed: May 8, 2019

(65) Prior Publication Data
US 2019/0346637 A1 Nov. 14, 2019

(30) Foreign Application Priority Data

May 9, 2018 (FR) ...................... 18 53950

(51) Int. Cl.
*G02B 6/42* (2006.01)

(52) U.S. Cl.
CPC .......... *G02B 6/4292* (2013.01); *G02B 6/424* (2013.01); *G02B 6/4206* (2013.01); *G02B 6/426* (2013.01); *G02B 6/423* (2013.01); *G02B 6/4246* (2013.01); *G02B 6/4284* (2013.01)

(58) Field of Classification Search
CPC ...... G02B 6/4206; G02B 6/423; G02B 6/424; G02B 6/4246; G02B 6/426; G02B 6/4281; G02B 6/4284; G02B 6/4292
See application file for complete search history.

(56) References Cited

U.S. PATENT DOCUMENTS

| 10,534,138 B2* | 1/2020 | Leigh ................ G02B 6/4246 |
| 2008/0044136 A1 | 2/2008 | Kanou et al. |
| 2011/0019998 A1 | 1/2011 | Wong et al. |
| 2012/0269486 A1 | 10/2012 | Ishii |

FOREIGN PATENT DOCUMENTS

CN 201689195 U 12/2010

OTHER PUBLICATIONS

French Preliminary Search Report dated Feb. 1, 2019 from Corresponding French Application No. FR 1853950.

* cited by examiner

*Primary Examiner* — Daniel Petkovsek
(74) *Attorney, Agent, or Firm* — Pearne & Gordon LLP

(57) ABSTRACT

The present invention relates to an optoelectronic module (M), intended to convert an electrical signal from a main electronic board into an optical signal or vice versa. It comprises integrating, into the optoelectronic module, a device for removably mounting an optical contact element, consisting of a flexible plate the flexibility of which allows it to be moved from an unlocking position in which it permits the passage of the body and of the optical ferrule of the element, to a locking position in which the latter is locked in the casing of the module, once the optical ferrule has been optically coupled to the module. Furthermore, a simple, even manual, pressure allows the plate to be moved from a locking position to an unlocking position that permits the optical element to be removed from the casing of the module.

19 Claims, 4 Drawing Sheets

OPTOELECTRONIC MODULE, AND DEVICE FOR TOOLESSLY MOUNTING/DEMOUNTING AN OPTICAL CONTACT ELEMENT

FIELD OF THE INVENTION

The present invention relates to an optoelectronic optical-link module, intended generally to be soldered to an electronic board, i.e. a printed circuit board (PCB), referred to as the application board, and intended to convert electrical signals into optical signals or vice versa.

An optical subassembly (OSA) is a subassembly comprising at least one (or more than one) optoelectronic component and the system that optically couples it (them) to one or more optical fibers.

The invention also relates both to a transmitter module, intended to convert an electrical signal into an optical signal, and to a receiver module intended to convert an optical signal into an electrical signal.

The invention also relates to a transceiver device combining a receiver module and a transmitter module that share common electronic circuits and a common electronic board, usually denoted by the term "transceiver", a combination of "TRANSmitter" and "reCEIVER".

The invention is primarily intended to allow optical contact elements to be removably mounted/demounted toolessly in the interior of optoelectronic modules fastened to an electronic board, in a way that is simple to implement and that does not increase the bulk of the modules.

The invention generally relates to optoelectronic modules in particular intended to be employed in the aeronautical field, the field of space technology, the field of defense technology, the transportation field or the medical field or even the telecommunications field, the data-communication field and the industrial field.

PRIOR ART

Optical-link systems that use optoelectronic modules and an optical link formed by one or more optical fibers are known. Each transmitter or receiver optoelectronic module consists of an electronic carrier board, of an optoelectronic component and of its electronic control component, of one or more optical fibers that may be joined to form ribbons and of an optical coupling device for coupling the optoelectronic component and the one or more optical fibers.

Each module is then fastened, by soldering or by way of an electrical connector, to an application board.

A functional optical linking system or optical link thus comprises at least one transmitter module and at least one receiver module optically coupled to the transmitter module via a fiber-coupled optical medium.

Mention may be made of the commercial products sold by the applicant RADIALL under the tradename D-Lightsys®, this range including not only receiver modules and transmitter modules, but also transceiver modules integrating both transmitter and receiver functions.

Although these optical linking systems have been and are still entirely satisfactory in particular in terms of the achieved performance, especially for broadband signals, they could be further improved in particular in terms of the weight, bulk, and the cost of production and assembly of the modules.

In particular, it could also be advantageous to develop fiber-optic interface solutions that are easy to assemble and easily demountable toolessly.

Optoelectronic-module solutions for optical contact elements such as LC or ELIO® connectors are available on the market. These optical contact elements possess their own snap-fastening or bayonet locking system. However, these locking systems are of large bulk.

Furthermore, the requirements of certain applications, whether they are on-board applications or not, mean that the maximum space that an optoelectronic module, whether it be the emitter or receiver, may occupy on each application board is very small.

Moreover, optical contact elements that use physical contact (PC) to create optical interconnections between optical fibers have also already thoroughly proven their worth both in hostile and non-hostile environments, examples of such optical contact elements being those of the LuxCis® range sold by RADIALL.

In addition, this type of optical contact does not possess its own locking element. These contacts are generally retained in the sockets of multi-contact connectors by clips that are inserted into these sockets and that interact with a groove of the optical contact, it being necessary, to demount them, to use a suitable extracting tool that is not always easy to manipulate.

In addition to the constraint of a fiber-optic interface that is simple and easily demountable, and to the constraint of a small footprint, there are other requirements to be taken into account:

- electro-optical conversion (transmitter) and optoelectronic conversion (receiver) of digital or analog signals must be possible in a band stretching from 0 to several tens of gigabits per second (Gbps) or gigahertz,
- it must be possible for the optical signal to transit from an electronic board to an item of electronic equipment or to another electronic board,
- a robust link must be defined, i.e. a link that is compatible with hostile environments, such as aerospace, aeronautic, medical, telecoms and defense environments, and in particular capable of operating at temperatures from −40° C. to +85° C., and/or of resisting shocks and vibrations, as required by the relevant aeronautical standards, and/or high levels of humidity,
- power consumption must be very low, typically lower than 100 mW per optical channel.

There is therefore a need to improve optical links to optoelectronic modules, with a view to allowing optical contact elements to be removably mounted/demounted toolessly in optoelectronic modules in a way that is easy and that does not increase bulk.

The aim of the invention is to at least partially meet this need.

SUMMARY OF THE INVENTION

To do so, one subject of the invention is an optoelectronic module intended to convert an electrical signal from a main electronic board into an optical signal or vice versa, comprising:

a casing inside of which are housed in a fastened manner:
  a main electronic board;
  at least one optical subassembly OSA comprising:
    at least one optoelectronic component suitable for transmitting or receiving a light signal via its upper surface along an optical axis (X),
    at least one holding sleeve suitable for holding centered therein a complementary optical ferrule that is integrated into an optical contact element extending about its central axis (X1), with the central axis (X1) coincident with the optical axis (X); and a mechanical stop setting the longitudinal position of the complementary ferrule once connected in the interior of the holding sleeve;

at least one flexible plate comprising an emergent aperture, the plate being fastened to the main electronic board and/or the casing of the module in such a way as to be able to flex between a flexed unlocking position in which the emergent aperture is able to let pass both the optically complementary ferrule and at least one portion of the body of the optical element, in which the complementary ferrule is housed, so that the complementary ferrule is able to be pushed and guided in the interior of the holding sleeve, along the optical axis (X), and, an unflexed locking position in which the plate is able to form a mechanical stop and thus to lock the body of the optical contact element locked in the interior of the casing with the complementary ferrule in the interior of the holding sleeve.

Preferably, in the locking position, the ferrules are optically coupled by physical contact between their faces.

It will be noted that, in the context of the invention, the main electronic board of the optoelectronic module is a printed circuit board or a stack of sheets of dielectrics, such as epoxy glass, in which a circuit is formed.

The electronic board of the module is necessarily independent of the application or end-use electronic board to which the module according to the invention is intended to be fastened. An optoelectronic module according to the invention may be fastened to an application board via the electrical interconnections of the latter.

By "optoelectronic component", what is meant here and in the context of the invention is chips or bare components, i.e. components that are not encased in a package or in other words encapsulated in an electrically insulating jacket.

By "electronic control components", what is meant here is driving components that may also take the form of bare components. However, they may also be encapsulated and located out of the module.

The optical subassembly may be a transmitter subassembly, the optoelectronic component being a laser. This laser may inter alia be a vertical-cavity surface-emitting laser (VCSEL). The optical subassembly may be a receiver subassembly, the optoelectronic component being a photodiode.

The optoelectronic module according to the invention may form a transmitter module (ME), and comprises one or more transmitter subassemblies. It may also form a receiver optoelectronic module comprising one or more receiver subassemblies. A module according to the invention may be hybrid and combine both transmitter and receiver functions. The optoelectronic module may be single-channel or multi-channel.

The invention essentially consists in integrating, into an optoelectronic module, a device for removably mounting an optical contact element, consisting of a flexible plate the flexibility of which allows it to be moved from an unlocking position in which it permits the passage of the body and of the optical ferrule of the element, to a locking position in which the latter is locked in the casing of the module, once the optical ferrule has been optically coupled to the module. Furthermore, a simple, even manual, pressure allows the plate to be moved from a locking position to an unlocking position that permits the optical element to be removed from the casing of the module.

By virtue of the invention, the need to use a tool to mount/demount optical contact elements is completely avoided.

Furthermore, since the flexible plate is directly integrated into the design of the casing, it is possible for the point where the optical contact element is locked to be located very close to back of the body thereof and therefore to define a mounting/demounting solution that does not decrease the compactness of the module.

Moreover, the flexible plate may serve as an electromagnetically shielding cover forming, with the casing, a closed cavity.

According to one advantageous embodiment, the plate comprises at least one tab serving as rest for a finger of an operator or for a tool suitable for making the plate flex and thus to move it from its locking position to its unlocking position, the flexibility of the plate returning the latter to its locking position in the absence of pressure on the tab.

According to one advantageous variant, the body of the casing comprises first guiding rails suitable for slidingly guiding the portion of the plate comprising the emergent aperture along the casing between its locking position and its unlocking position.

According to another advantageous variant, the emergent aperture of the plate comprises a notch for interacting with a fool-proofing protrusion of the body of the optical contact element, in order to form a system for fool proofing the latter during its introduction with the complementary ferrule into the interior of the casing.

According to this variant, the body of the casing advantageously comprises second guiding rails suitable for slidingly guiding the fool-proofing protrusion as the complementary ferrule is pushed, so as to guide it during its introduction into the holding sleeve.

Preferably, the flexible plate is a metal plate, and more preferably one made of copper-beryllium alloy ($CuBe_2$).

The flexible plate may be fastened by soldering directly to the edges of the casing.

Advantageously, the casing holds a screw that passes not only through the casing, but also through the main electronic board and the flexible plate, the screw being intended to fasten the module to an electronic board of an item of application electronic equipment.

According to one embodiment, the optical subassembly comprises an electronic interface board intended to serve as interface with the main electronic board, the electronic interface board being a folded printed circuit board, so as to make the electrical connections with the main electronic board through an angle.

Another subject of the invention is an optoelectronic assembly comprising:

at least one module such as described above, and an optical contact element comprising a return spring, in particular a helicoidal spring, in order to bring the body of the optical contact element into abutment against the flexible plate, and against the mechanical stop that defines the optical coupling position with respect to the OSA, once the optical contact element is locked in the interior of the casing.

Lastly, one subject of the invention is a method for removably mounting toolessly an optical contact element in a module of an optoelectronic module such as described above, comprising the following steps:

a/ manually introducing and manually guiding the complementary ferrule integrated into the optical contact element, through a through-aperture of the flexible plate;

b/ manually pushing the optical contact element until the complementary ferrule guided in the interior of the holding sleeve reaches its position of optical coupling to the OSA;

c/ releasing the optical contact element, so as to cause it to be locked in the interior of the casing by the flexible plate in locking position.

According to one advantageous embodiment, the method may comprise, before step b/, a step a1/ of applying a manual pressure to one portion of the flexible plate so as to move it from its locking position to its unlocking position.

According to this embodiment, the method may comprise, after step b/, a step b1/ of releasing the manual pressure on the flexible plate portion.

Preferably, step c/ is carried out with the body of the optical contact element placed in abutment via a return spring that is either integrated into the optical contact element or housed in the casing.

According to one advantageous variant, the method may comprise, before step b/, a step a2/ of rotating the optical contact element about itself so as to orient a fool-proofing protrusion of the body of the optical contact element to face the notch in the emergent aperture of the plate, in order to form a fool-proofing system, and of slidingly guiding the body in second guiding rails during its introduction with the complementary ferrule into the interior of the casing.

DETAILED DESCRIPTION

Other advantages and features of the invention will become more clearly apparent on reading the detailed description of examples of implementation of the invention, which description is given by way of illustration and non-limitingly with reference to the following figures, in which.

Figure 6:
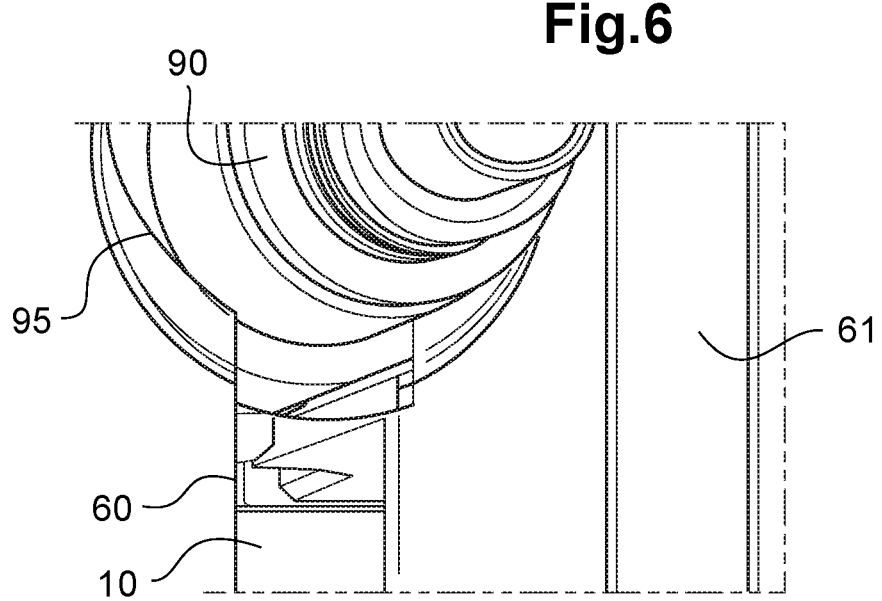

FIGS. 5A to 5D schematically show in perspective the steps by which an optical contact element is removably mounted in an optoelectronic module according to the invention;

FIG. 6 is a perspective detail view from behind the optical contact element showing the means for guiding and locking an optical contact element within an optoelectronic module according to the invention.

Throughout the application, the terms "vertical", "lower", "upper", "bottom", "top", "below" and "above" are to be understood with reference to an optoelectronic module according to the invention with the main electronic board 10 in a horizontal installed configuration, i.e. fastened to an application electronic board, and to the in particular active components of the module above the board.

Figure 1:
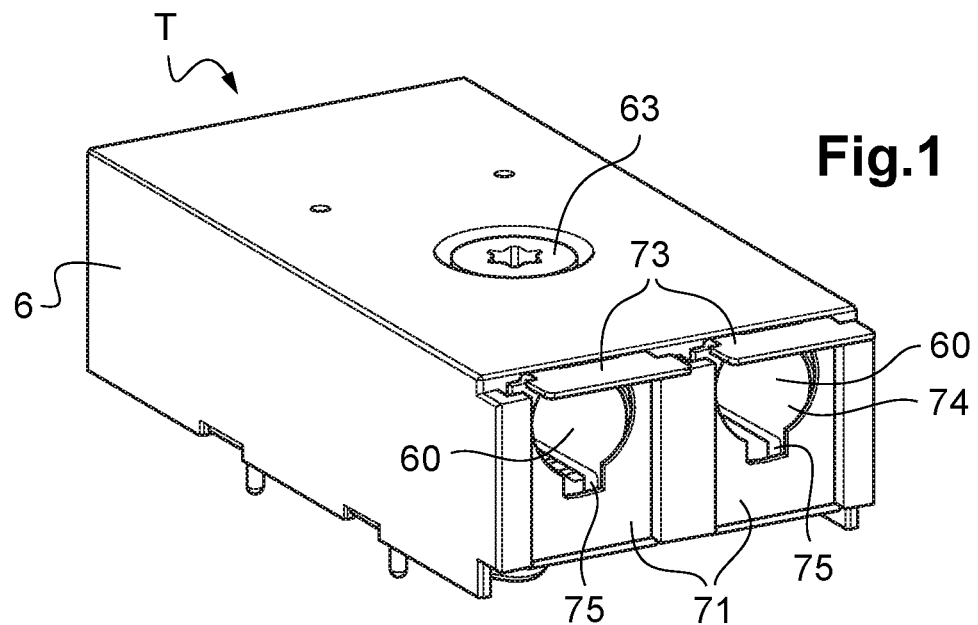
FIG. 1 is a schematic perspective view of one example embodiment of an optoelectronic module according to the invention incorporating two optical subassemblies (OSAs)
Figure 2:
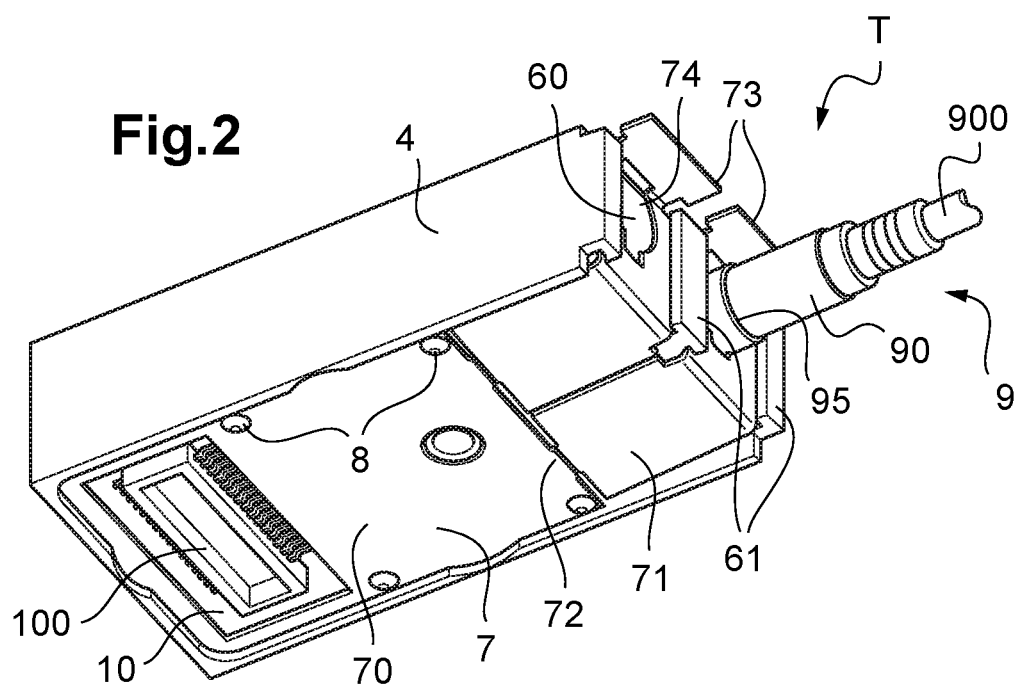
FIG. 2 is a perspective view from below of the optoelectronic module in FIG. 1.

FIGS. 1 and 2 show an optoelectronic module T according to the invention incorporating two optical subassemblies 2 (OSAs).

The module T comprises a main electronic board 10 to which the two subassemblies 2 are fastened via their respective carrier electronic boards 1.

The board 10 will serve as interface with an application electronic board or an item of electronic equipment. To do so, the main board 10 comprises interconnection tracks 100 that protrude under the board 10.

As illustrated in FIGS. 5A to 5D, more precisely, each optical subassembly $M_1$, $M_2$ comprises a carrier electronic board 1 that is folded, at right angles in the illustrated example, fastened and electrically connected to the common electronic board 10.

Instead of a printed circuit board 10 (PCB), it is possible also to have an electronic board the substrate of which consists of a stack of layers or sheets of dielectrics, such as alumina, and within which a circuit of electrical conductors is arranged.

Thus, one portion 11 of each carrier board 1 is in plane-plane abutment against the substrate of the common electronic board 10 whereas the other portion 12, which is doglegged, is inclined, at right angles in the illustrated example, with respect to the substrate of the board 10.

At the end of the non-doglegged portion 11 emerge the conductive tracks 13 for making the electrical connection to the conductive tracks of the common main board 10.

Each optical subassembly 2 also comprises a holding sleeve 20, which may be held by a holding cage 21, and the geometric axes (X') of which are aligned with the optical axis (X) of the optical subassembly.

With this arrangement, the optical axis X of each optical subassembly 2 is parallel to the substrate of the common board 10. This arrangement is advantageous because all of the components of the modules extend along the axis X parallel to the substrate of the common board and therefore heightwise bulk is greatly decreased.

The module T also comprises a metal casing 6 that houses all of the components that have just been described.

More precisely, the casing 6, which is of parallelepipedal general shape, forms a closed jacket all the way around the main electronic board 10 and the optical subassemblies 2 with the exception of below the board 10 and of one lateral edge, which are for their part almost completely closed by a flexible plate 7 according to the invention.

Preferably, this flexible plate 7 is made of metal and typically of copper-beryllium alloy $CuBe_2$.

Thus, once the optical contact elements are connected and locked by the plate 7 in the interior of the casing 6, the latter 6 and the plate 7 form an electromagnetic shield both around all the active components within the casing 6 and about the electrical interconnection tracks 13.

The casing 6 comprises within it two guiding housings 60 of substantially cylindrical shape that each extend facing one optoelectronic-module optical subassembly 2. More precisely, the guiding housings 60 are each aligned along the optical axis X, one of their ends opening onto the exterior whereas the other opens in proximity and facing the holding sleeve 20 of the optical subassembly 2.

The casing 6 also comprises at the interface with the exterior pairs of guiding rails 61, each facing one guiding housing 60.

Each guiding housing 60 is slit in its lower portion so as to produce a guiding rail 62.

The casing 6 holds a screw 63 that passes through the interior of the casing and the main electronic board 10 in order to fasten the optoelectronic module T to an electronic board of an item of application equipment (not shown).

Figure 3:
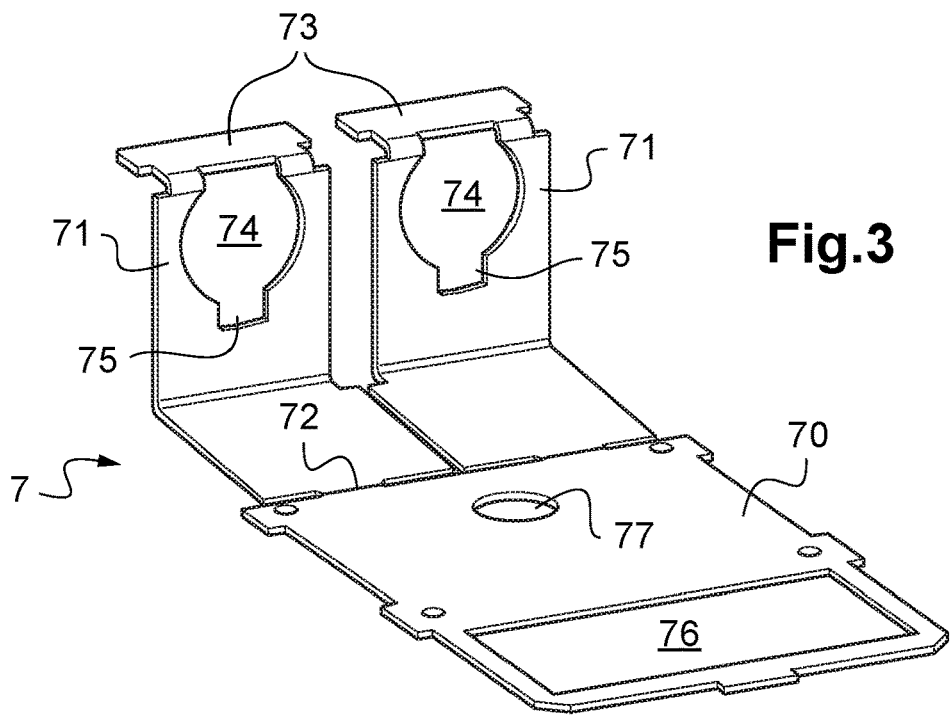
FIG. 3 is a perspective view of a flexible plate forming the device for removably fastening toolessly optical contact elements within the casing of the module in FIGS. 1 and 2.
Figure 4A:
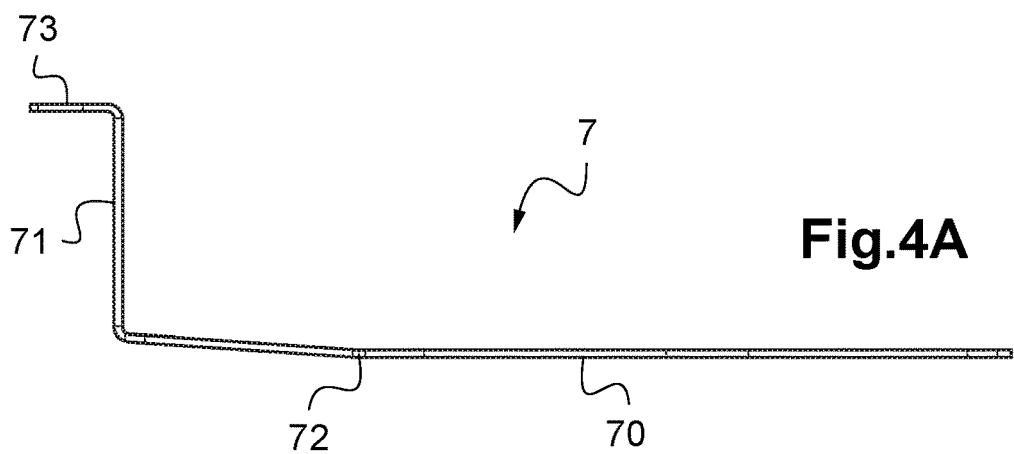
FIGS. 4A and 4B are side views of the flexible plate such as it is when mounted in the casing of the module in FIGS. 1 and 2, respectively in its position for locking the optical contact elements, in which position it is not flexed, and in its unlocking position, in which position it is flexed by a pressure, potentially a manual pressure.
Figure 4B:
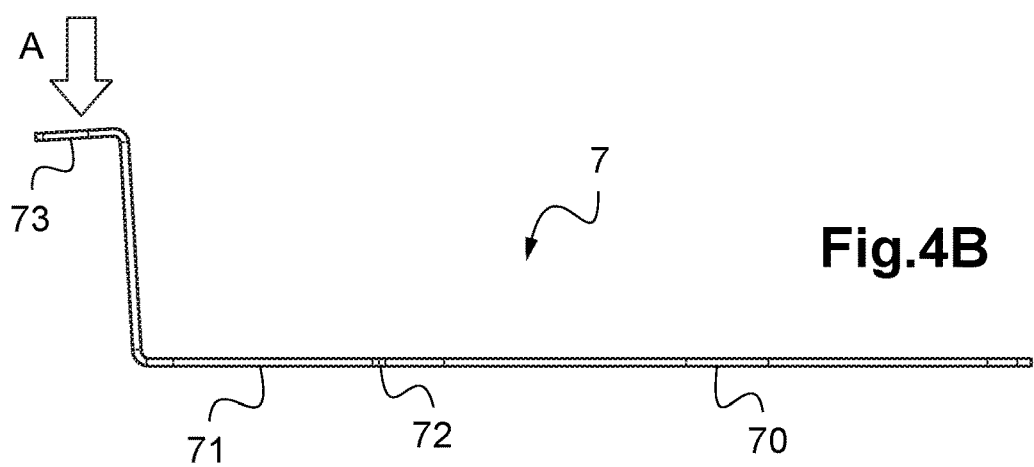

The flexible plate 7 is detailed in FIGS. 3, 4A and 4B: it firstly comprises an attaching portion 70 and two flexible portions 71 that are each hinged to the attaching portion 70 about a line of flexion 72. Without applied mechanical stress, this plate has a slightly curved shape.

Each flexible portion 71 is equipped with a rest portion 73 to which a pressure, potentially a manual pressure, may be applied, said portion being folded to substantially 90° with respect to the flexible portion 71. As symbolized by the arrow A in FIG. 4B, when the plate 7 is fastened to the casing 6, simply applying manual pressure to the rest portion 73 makes the portion 71 flex about the line of flexion 72. This pressure may also be applied with a suitable tool. Depending on the shape of the front of the optical contact element, it might not necessarily be essential for this pressure to be applied.

The attaching portion 70 is also drilled:
- with a through-aperture 74 of circular general shape with a fool-proofing notch 75;
- with a through-aperture 76 of dimensions complementary to those of the electrical interconnection tracks of the board 10 that pass therethrough;
- with a through-aperture 77 of dimensions complementary to the screw 63 that passes therethrough.

In the configuration of use, the flexible plate 7 is therefore soldered, via its attaching portion 70, to rims of the casing 6, at the points 8.

The application board is electrically interconnected with the module via an electrical connector 100 positioned in the aperture 76, and the aperture 77 is passed through by the screw 63.

Each flexible portion 71 is held in the casing 6 via guiding rails 61 that therefore allow the flexible portion 71 to slide when the latter is to be flexed by potentially manual pressure applied to the portion 73.

Each flexible plate 7 such as described forms a device for removably mounting an optical contact element 9.

Each optical contact element 9 includes a body 90 that bears an optical fiber 900. A ferrule 91 is centered and held in the body 90 in a mounting with axial freedom.

More precisely, a holding sleeve 92, which holds and centers therein the optical ferrule 91, is mounted with axial freedom via a helicoidal spring 93 wound around the sleeve 92 in the interior of the body 90.

The holding sleeve 92 comprises a fool-proofing protrusion 94.

The body 90 of the optical contact element 9 comprises a shoulder 95.

Each optical contact element 9 may be of the same type as those already used in the connectors of the LuxCis® range sold by RADIALL. However, any contact element without its own locking system may be used.

The various steps by which an optical contact element 9 is removably mounted toolessly in an optoelectronic module T according to the invention will now be described with reference to FIGS. 5A to 5D.

Figure 5A:
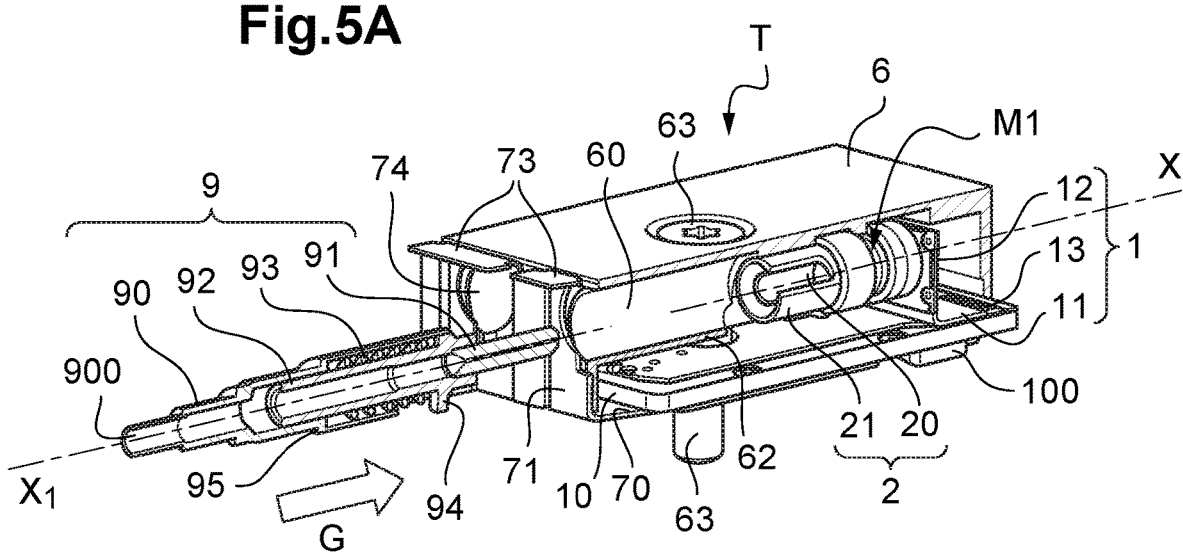

Step a/: the ferrule 91 that is integrated into the optical contact element 9 is introduced into and manually guided through a through-aperture 74 of the flexible plate 7 (FIG. 5A, guidance indicated by the arrow G).

Figure 5B:
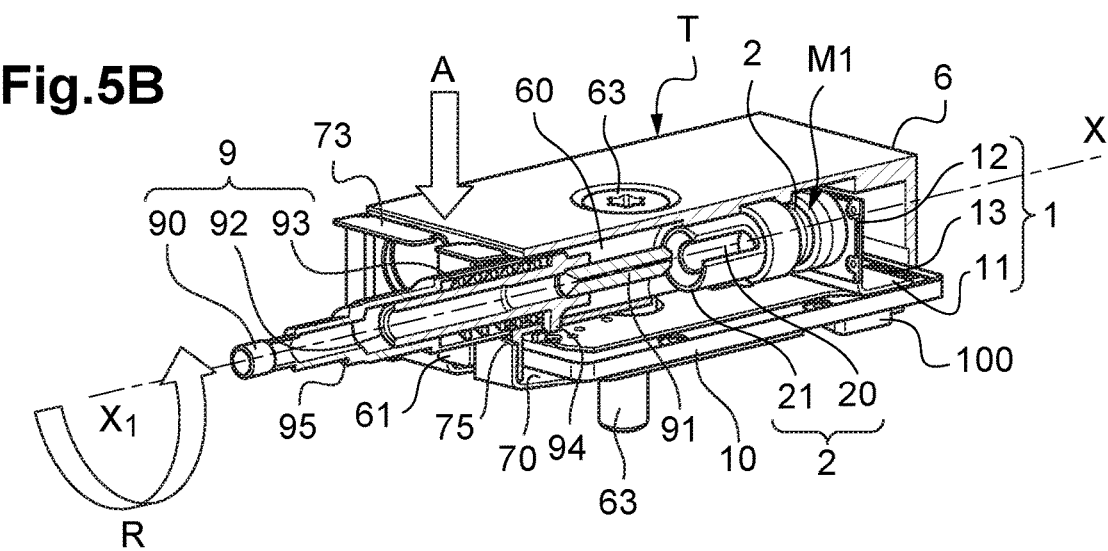

Step a1/: pressure is applied to the portion 73 of the flexible plate 7 so as to make it flex and thus to move it from its locking position to its unlocking position (FIG. 5B, pressure indicated by the arrow A). The moving portion 71 of the plate 7 is guided along the casing 6 via its guiding rails 61.

Step a2/: simultaneously to or before step a1/, if necessary, the optical contact element 9 is rotated about itself so as to orient its fool-proofing protrusion 94 to face the notch 75 of the emergent aperture 74 of the plate 7 (FIG. 5B, rotation indicated by the arrow R.).

Figure 5C:
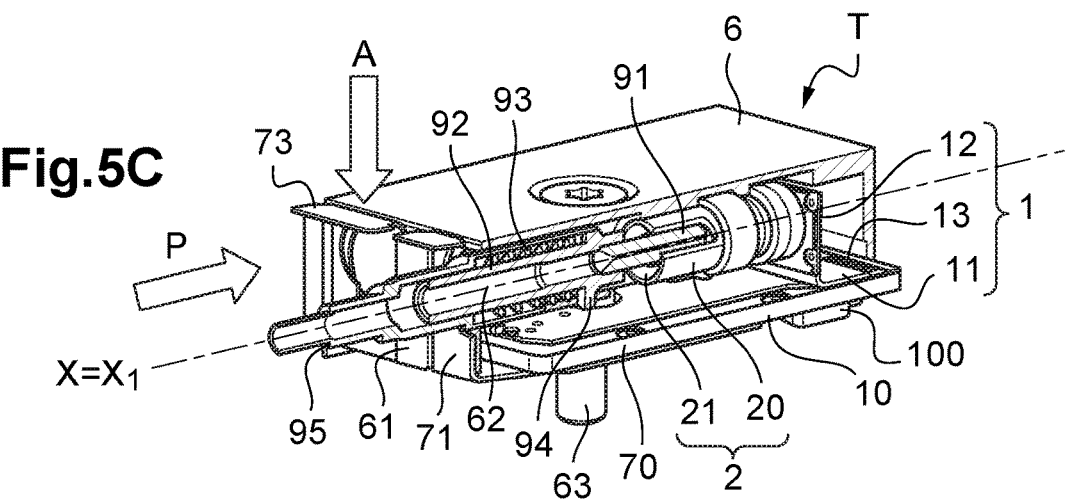

Step b/: the optical contact element 9 is then pushed manually until its ferrule 91, guided in the interior of the holding sleeve 20, reaches its position of optical coupling by physical contact (PC) to the ferrule 31 of the module (FIG. 5C, pushing action indicated by the arrow P).

While the optical contact element 9 is being pushed to the end of its journey, the pressure is maintained in order to keep the flexible plate 7 in its flexed unlocking position. Throughout its journey, the optical element 9 is guided through the casing 6 by the fool-proofing protrusion 94, which is slidingly guided in the guiding rails 62 of the housing 60.

Step b1/: once the optical coupling between the ferrules 31, 91 has been achieved, the manual pressure on the portion 73 is released. The plate 7 then returns to its unflexed locking position.

Figure 5D:
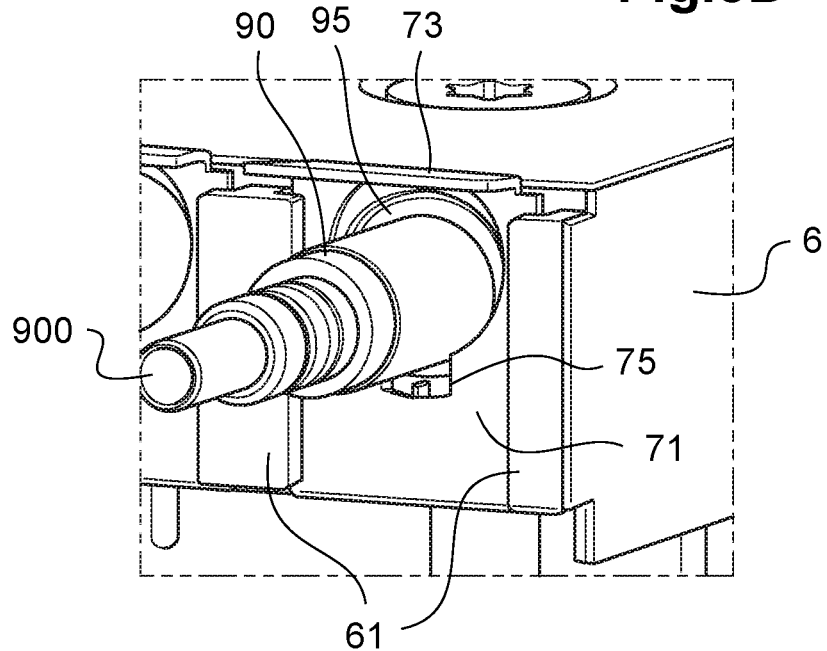

Step c/: simultaneously or after step b1/, the optical contact element 9 is then released. The return spring 93 then places the shoulder 95 of the body 90 of the optical contact element in abutment against the portion 71 of the plate 7 (FIG. 5D).

The spring also presses the other end of the optical contact element 9 and its optical ferrule 91 against a mechanical stop. This mechanical stop may consist either of the face of a fiber-coupled optical ferrule located at the entrance of the OSA, or by a relief at the end of the holding cage or of the holding sleeve. The stop may also be at the other end of the holding sleeve if the ferrule protrudes from the optical contact element by a precise amount. Other solutions could also be envisioned, the function of the mechanical stop being to precisely set the longitudinal position of the ferrule 91 of the optical contact element 9 once the former is connected in the casing and to thus optimize the optical coupling to the OSA.

Thus, the optical coupling in the sleeve 20 is guaranteed and the optical contact element 9 is locked in the interior of the casing 6 by the flexible plate 7 in locked position (FIG. 8).

Provision may be made for other variants and improvements without however departing from the scope of the invention.

The expression "comprising a" must be understood as being synonymous with "comprising at least one" unless otherwise indicated.

The invention claimed is:

1. An optoelectronic module (M) intended to convert an electrical signal from a main electronic board into an optical signal or vice versa, comprising:
   a casing inside of which are housed in a fastened manner:
      a main electronic board;
      at least one optical subassembly (OSA) comprising:
         at least one optoelectronic component suitable for transmitting or receiving a light signal via its upper surface along an optical axis (X),
         at least one holding sleeve suitable for holding centered therein a complementary optical ferrule that is integrated into an optical contact element extending about its central axis, with the central axis (X1) coincident with the optical axis (X); and
         a first mechanical stop setting the longitudinal position of the complementary ferrule once connected in the interior of the holding sleeve; and at least one flexible plate comprising an emergent aperture, the plate being fastened to the main electronic board and/or the casing of the module and configured to movably flex between a flexed unlocking position and an unflexed locking position, wherein at the flexed unlocking position the emergent aperture is positioned to let pass both the optically complementary ferrule and at least one portion of the body of the optical contact element that houses the complementary ferrule, so that the complementary ferrule is able to be pushed and guided into the interior of the holding sleeve, and wherein at the unflexed locking position the plate is configured to form a second mechanical stop that locks the body of the optical contact element inside the interior of the casing with the complementary ferrule in the interior of the holding sleeve.

2. The optoelectronic module (M) as claimed in claim 1, wherein the plate comprises at least one tab serving as rest for a finger of an operator or for a tool suitable for making the plate flex and thus to move it from its locking position to its unlocking position, the flexibility of the plate returning the latter to its locking position in the absence of pressure on the tab.

3. The optoelectronic module (M) as claimed in claim 1, wherein the body of the casing comprises first guiding rails suitable for slidingly guiding the portion of the plate comprising the emergent aperture along the casing between its locking position and its unlocking position.

4. The optoelectronic module (M) as claimed in claim 1, wherein the emergent aperture of the plate comprises a notch for interacting with a fool-proofing protrusion of the body of the optical contact element, in order to form a system for fool proofing the latter during its introduction with the complementary ferrule into the interior of the casing.

5. The optoelectronic module (M) as claimed in claim 4, wherein the body of the casing furthermore comprises second guiding rails suitable for slidingly guiding the fool-proofing protrusion as the complementary ferrule is pushed, so as to guide it during its introduction into the holding sleeve.

6. The optoelectronic module (M) as claimed in claim 1, wherein the flexible plate is a metal plate.

7. The optoelectronic module (M) as claimed in claim 1, wherein the flexible plate is fastened by soldering directly to the edges of the casing.

8. The optoelectronic module (M) as claimed in claim 1, wherein the casing holds a screw that passes not only through the casing, but also through the main electronic board and the flexible plate, the screw being intended to fasten the module to an electronic board of an item of application electronic equipment.

9. The optoelectronic module as claimed in claim 1, forming a transmitter module (ME), the module comprising one or more transmitter subassemblies.

10. The optoelectronic module as claimed in claim 1, forming a receiver module (MR), the module comprising one or more receiver subassemblies.

11. The optoelectronic module as claimed in claim 1, wherein the subassembly comprises an electronic interface board intended to serve as interface with the main electronic board, the electronic interface board being a folded printed circuit board, so as to make the electrical connections with the main electronic board through an angle.

12. The optoelectronic module as claimed in claim 1, forming a transceiver comprising a transmitter subassembly and a receiver subassembly.

13. The transceiver (T) as claimed in claim 12, wherein the printed circuit board of the receiver subassembly and that of the transmitter subassembly are folded at right angles so that the optical axes of said optoelectronic modules are parallel to the substrate of the main electronic board.

14. An optoelectronic assembly comprising:
at least one module as claimed in claim 1, and
an optical contact element comprising a return spring, in particular a helicoidal spring, in order to bring the body of the optical contact element into abutment against the flexible plate, and against the first mechanical stop that defines the optical coupling position with respect to the OSA, once the optical contact element is locked in the interior of the casing.

15. A method for removably mounting toolessly an optical contact element in a module of an optoelectronic module as claimed in claim 1, comprising the following steps:
a/ manually introducing and manually guiding the complementary ferrule integrated into the optical contact element, through a through-aperture of the flexible plate;
b/ manually pushing the optical contact element until the complementary ferrule guided in the interior of the holding sleeve reaches its position of optical coupling to the OSA;
c/ releasing the optical contact element, so as to cause it to be locked in the interior of the casing by the flexible plate in locking position.

16. The method for removably mounting as claimed in claim 15, comprising, before step b/, a step a1/ of applying a manual pressure to one portion of the flexible plate so as to move it from its locking position to its unlocking position.

17. The method for removably mounting as claimed in claim 16, comprising, after step b/, a step b1/ of releasing the manual pressure on the flexible plate portion.

18. The method for removably mounting as claimed in claim 15, wherein step c/ is carried out with the body of the optical contact element placed in abutment via a return spring that is either integrated into the optical contact element or housed in the casing.

19. The method for removably mounting as claimed in claim 15, comprising, before step b/, a step a2/ of rotating the optical contact element about itself so as to orient a fool-proofing protrusion of the body of the optical contact element to face the notch in the emergent aperture of the plate, in order to form a fool-proofing system, and of slidingly guiding the body in second guiding rails during its introduction with the complementary ferrule into the interior of the casing.

* * * * *